United States Patent
Shen

(10) Patent No.: US 8,874,886 B2
(45) Date of Patent: Oct. 28, 2014

(54) EXECUTING SOFT RESET FOR INTELLIGENT TERMINAL IN ABNORMAL INSTRUCTION STATE AND HARD RESET FOR INTELLIGENT TERMINAL IN DEAD HALT STATE

(75) Inventor: Shaowu Shen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 211 days.

(21) Appl. No.: 13/258,399

(22) PCT Filed: Mar. 31, 2010

(86) PCT No.: PCT/CN2010/071476
§ 371 (c)(1),
(2), (4) Date: Jun. 27, 2012

(87) PCT Pub. No.: WO2010/148693
PCT Pub. Date: Dec. 29, 2010

(65) Prior Publication Data
US 2012/0265974 A1    Oct. 18, 2012

(30) Foreign Application Priority Data

Dec. 28, 2009  (CN) .......................... 2009 1 0258196

(51) Int. Cl.
G06F 1/24    (2006.01)
(52) U.S. Cl.
CPC ...................................... G06F 1/24 (2013.01)
USPC ............................................................ 713/1
(58) Field of Classification Search
CPC ... G06F 1/24; G06F 11/0721; G06F 11/1438; G06F 11/1441; G06F 12/0891
USPC .......................................................... 713/1
See application file for complete search history.

(56) References Cited

U.S. PATENT DOCUMENTS

| 5,850,546 A * | 12/1998 | Kim .................................. 713/1 |
| 2004/0177242 A1* | 9/2004 | Erickson et al. .................. 713/2 |
| 2007/0135105 A1 | 6/2007 | Bitou |
| 2009/0013221 A1* | 1/2009 | Yanagihara et al. ............ 714/55 |

FOREIGN PATENT DOCUMENTS

| CN | 101146289 A | 3/2008 |
| CN | 101179804 A | 5/2008 |

(Continued)

OTHER PUBLICATIONS

International Search Report in international application No. PCT/CN2010/071476, mailed on Sep. 23, 2010.

(Continued)

Primary Examiner — Thomas Lee
Assistant Examiner — Danny Chan
(74) Attorney, Agent, or Firm — Oppedahl Patent Law Firm LLC

(57) ABSTRACT

The disclosure discloses a method for resetting an intelligent terminal, including: receiving a reset instruction input by a user after a receiving state of reset instructions is started; determining whether the reset instruction is valid, determining a current running state of the intelligent terminal when the received reset instruction is valid, and triggering a reset of the intelligent terminal when the intelligent terminal is in a dead halt state or an abnormal instruction state. The disclosure further discloses a device for resetting an intelligent terminal. The disclosure can perform a soft reset of the intelligent terminal quickly, conveniently and securely, thereby greatly avoiding the instable work state caused by disassembling battery and avoiding the reset misoperation caused by the resetting of the existing single function key.

8 Claims, 2 Drawing Sheets

(56) References Cited

FOREIGN PATENT DOCUMENTS

| JP | 2003111143 A | 4/2003 |
| JP | 2004064291 A | 2/2004 |
| KR | 20040041385 A | 5/2004 |

OTHER PUBLICATIONS

English Translation of the Written Opinion of the International Search Authority in international application No. PCT/CN2010/071476, mailed on Sep. 23, 2010.

* cited by examiner

EXECUTING SOFT RESET FOR INTELLIGENT TERMINAL IN ABNORMAL INSTRUCTION STATE AND HARD RESET FOR INTELLIGENT TERMINAL IN DEAD HALT STATE

TECHNICAL FIELD

The disclosure relates to the technology of resetting an intelligent terminal, and in particular to a method and device for resetting an intelligent terminal.

BACKGROUND

Due to the complexity of a system and the diversification of application programs in the usage process, an intelligent terminal is getting closer to a daily used personal computer. In the usual usage of an intelligent terminal, people often flash and upgrade the intelligent terminal and install various small application softwares in the intelligent terminal; particularly, game players will frequently install various new mini games, however, due to the problems such as diversification of terminal models, operating systems and platforms of intelligent terminals, diversification of radio access device interfaces, compatibility of games and the like, turning off, turning on, starting and resetting an intelligent terminal are the more common operations. Taking the most commonly used mobile phone in intelligent terminals as example:

the common resetting methods of a mobile phone are as follows: (1) normally turning on and turning off, that is, pressing the power key for a few seconds to realize the resetting and restarting of the mobile phone; (2) hard resetting, that is, entering into a boot interface in the cooperation of the function key and the power key, and restoring the factory settings by inputting the initial resetting password; (3) soft starting, that is, pressing the resetting hole in the terminal for a few seconds by using a sharp object to start the terminal.

In case of the non-fatal dead halt of an intelligent terminal in a normal operation, the intelligent terminal can be reset and restarted by the power key; however, if the intelligent terminal encounters dead halt, invalid soft reset, exceptions of a flashing process and the like, it is necessary to restore the intelligent terminal system by hard starting.

If an intelligent terminal has been configured to a long time, the registry will be damaged due to junk files and some third-party softwares usually installed, which makes the intelligent terminal respond slowly, stop responding or be dead halt. If an intelligent terminal operates much slowly, or some program operates abnormally, even a dead halt of the intelligent terminal occurs, it is generally required to solve these problems by soft resetting. After some programs are installed, soft resetting may also be needed. Meanwhile, in the usual usage, the intelligent terminal further needs to be reset by soft resetting at intervals, so as to clarify the intelligent terminal system and smoothen the operation program.

At present, there are three soft resetting methods as follows:

(1) directly disassembling battery to power off to realize soft starting; the defects of this method are as follows: sudden power-off of an intelligent terminal will result in loss of data being edited, and sudden loss of the latest address list and short messages in memory; and an abnormal turn-off and power-off will result in sudden interruption of current, resulting in that the terminal cannot be turned on due to permanent damage of partial devices in the terminal;

(2) pressing the resetting hole for a few seconds by using a sharp object to realize soft resetting; the defects of this method are as follows: it is inconvenient to perform the operation, and an extremely sharp and thin tool is needed; some resetting holes are arranged in the terminal battery groove, thus it is necessary to pull out the battery before resetting; the setting of a resetting hole in the intelligent terminal not only influences the appearance of intelligent terminal, but also increases cost of opening the resetting hole; and (3) realizing soft resetting by pressing a certain function key or an assemblage of two function keys for a long time; the defects of this method are as follows: a single function key is very easy to cause a misoperation; although an assemblage of two function keys may reduce possibility of misoperation, misoperation still be easily caused when a large area of the keyboard is pressed; and it is not as convenient as the soft starting in a normal mode.

SUMMARY

In view of the problems above, the main object of the disclosure is to provide a method and device for resetting an intelligent terminal, which are greatly convenient for the resetting of the intelligent terminal.

In order to realize the above object, the technical solution of the disclosure is realized as follows.

A method for resetting an intelligent terminal includes:
receiving a reset instruction input by a user after a receiving state of reset instructions is started;
determining whether the reset instruction is valid, determining a current running state of the intelligent terminal when the received reset instruction is valid, and triggering a reset of the intelligent terminal when the intelligent terminal is in a dead halt state or an abnormal instruction state.

Preferably, the step of triggering the reset of the intelligent terminal may include:
triggering a hard reset of the intelligent terminal when the intelligent terminal is in a dead halt state; and
triggering a soft reset of the intelligent terminal when the intelligent terminal is in an abnormal instruction state.

Preferably, the reset instruction may be an assemblage sequence of keyboard keys of the intelligent terminal.

Preferably, the resetting method may further include:
setting a key of the intelligent terminal as a reset starting key; and
starting, by the intelligent terminal, the receiving state of reset instructions when a duration of the reset starting key being pressed reaches a set threshold.

Preferably, the resetting method may further include:
executing no reset instruction, when the reset instruction is valid and the current running state of the intelligent terminal is a normal instruction state.

A device for resetting an intelligent terminal, including: a starting unit, a receiving unit, a determining unit, a determination unit and a resetting unit; wherein
the starting unit is configured to start a receiving state of reset instructions of the intelligent terminal;
the receiving unit is configured to receive a reset instruction input by a user;
the determining unit is configured to determining whether the reset instruction is valid, and trigger the determination unit when the reset instruction is valid;
the determination unit is configured to determine a current running state of the intelligent terminal, and trigger the resetting unit when the intelligent terminal is in a dead halt state or an abnormal instruction state; and
the resetting unit is configured to reset the intelligent terminal.

Preferably, the resetting unit may trigger a hard reset of the intelligent terminal when the determination unit determines that the intelligent terminal is in a dead halt state; and the resetting unit may trigger a soft reset of the intelligent terminal when the determination unit determines that the intelligent terminal is in an abnormal instruction state.

Preferably, the reset instruction may be a assemblage sequence of keyboard keys of the intelligent terminal.

Preferably, the resetting unit may further include:

a setting unit configured to set a key of the intelligent terminal as a reset starting key;

wherein when a duration of the reset starting key being pressed reaches a set threshold, the starting unit starts the receiving state of reset instructions of the intelligent terminal.

Preferably, the resetting unit may execute no reset instruction, when the determining unit determines that the reset instruction is valid and the determination unit determines that the current running state of the intelligent terminal is a normal instruction state.

In the disclosure, a reset starting key is set on the keyboard of an intelligent terminal; the receiving state of reset instructions of the intelligent terminal is started by pressing the reset starting key for a long time; a determining is performed after a reset instruction input by a user is received; the current state of the intelligent terminal is determined after the reset instruction is determined to be valid, and then a reset operation is performed according to the state of the intelligent terminal. The disclosure can perform a soft reset of the intelligent terminal quickly, conveniently and securely, thereby greatly avoiding the instable work state caused by disassembling battery and avoiding the reset misoperation caused by the resetting of the existing single function key.

DETAILED DESCRIPTION

The basic principle of the disclosure is that: a reset starting key is set on the keyboard of an intelligent terminal; the receiving state of reset instructions of the intelligent terminal is started by pressing the reset starting key for a long time; a determining is performed after a reset instruction input by a user is received; the current state of the intelligent terminal is determined after the reset instruction is determined to be valid, and then a reset operation is performed according to the state of the intelligent terminal.

Figure 1:
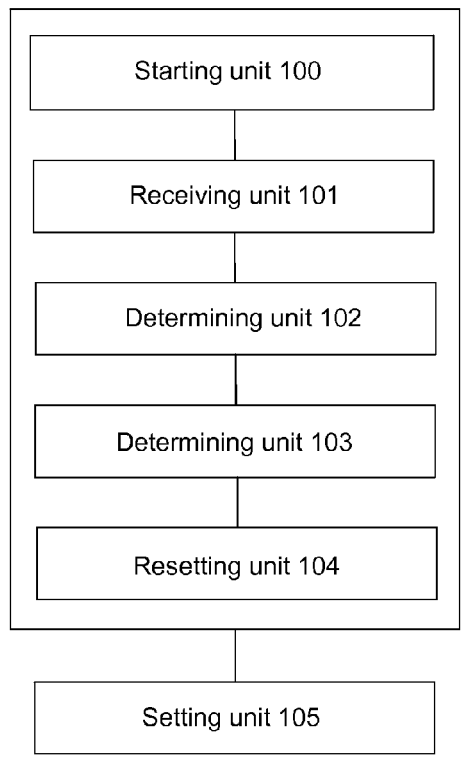
FIG. 1 shows a schematic diagram illustrating a composition and structure of a device for resetting an intelligent terminal according to the disclosure.

FIG. 1 shows a schematic diagram illustrating a composition and structure of a device for resetting an intelligent terminal according to the disclosure; as shown in FIG. 1, the device for resetting an intelligent terminal according to the disclosure comprises: a starting unit 100, a receiving unit 101, a determining unit 102, a determination unit 103 and a resetting unit 104; wherein the starting unit 100 is configured to start a receiving state of reset instructions of the intelligent terminal; the receiving unit 101 is configured to receive a reset instruction input by a user; the determining unit 102 is configured to determining whether the reset instruction is valid, and trigger the determination unit 103 when determining that the reset instruction is valid; the determination unit 103 is configured to determine the current running state of the intelligent terminal, and trigger the resetting unit 104 when the intelligent terminal is in a dead halt state or an abnormal instruction state; and the resetting unit 104 is configured to reset the intelligent terminal. When the determining unit 102 determines that the reset instruction is valid and the determination unit 103 determines that the current running state of the intelligent terminal is a normal instruction state, the resetting unit 104 does not execute the reset instruction.

Wherein, when the determination unit 103 determines that the intelligent terminal is in a dead halt state currently, the resetting unit 104 triggers a hard reset of the intelligent terminal; when the determination unit 103 determines that the intelligent terminal is in an abnormal instruction state, the resetting unit 104 triggers a soft reset of the intelligent terminal.

The reset instruction above is an assemblage sequence of the keyboard keys of the intelligent terminal. The reset instruction can be either a key assemblage of letter keys, such as "adgj", "ajtwp" and the like, or a key assemblage of number keys, such as "12345", "101001" and the like; the length and the assemblage mode of the above-mentioned reset instruction can be set arbitrarily.

As shown in FIG. 1, the device for resetting the intelligent terminal according to the disclosure may further comprise a setting unit 105 configured to set a key of the intelligent terminal as a reset starting key, when a duration of the reset starting key being pressed reaches a set threshold, the starting unit 100 starts the receiving state of reset instructions of the intelligent terminal.

Figure 2:
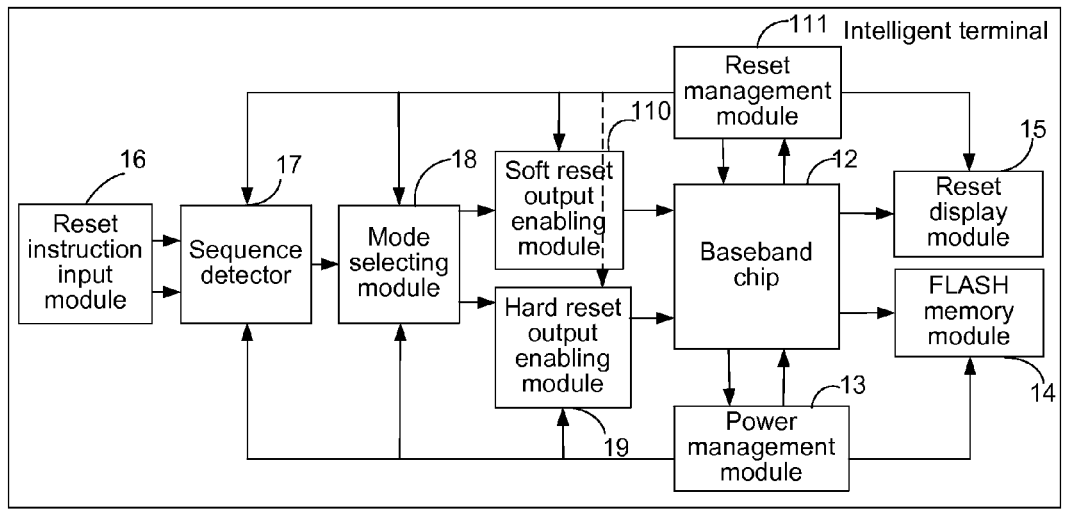
FIG. 2 shows a schematic diagram illustrating an application structure of an intelligent terminal according to the disclosure.

FIG. 2 shows a schematic diagram illustrating an application structure of an intelligent terminal according to the disclosure; the intelligent terminal according to the disclosure may comprise a resetting module, a baseband chip 12, a power management module 13, a FLASH memory module 14 and a reset display module 15. Wherein the resetting module in the disclosure may comprise a reset instruction input module 16, a sequence detector 17, a mode selecting module 18, a hard reset output enabling module 19, a soft reset output enabling module 110 and a reset management module 111. Wherein:

the reset instruction input module 16 is connected with the sequence detector 17, and is configured to complete the input of the reset instruction; here, the reset instruction is realized by an assemblage of corresponding keys on the intelligent terminal keyboard; specifically, the enabling or disabling of the receiving state of reset instructions is realized by pressing a control key for a long time, when the control key is pressed for a set period of time, the receiving state of reset instructions of the intelligent terminal is started, it is indicated that high level is valid and the sequence code input at this moment is valid; when the control key is pressed again for a set period of time, the receiving state of reset instructions of the intelligent terminal is disabled, it is indicated that low level is invalid and the sequence code input at this moment is invalid. Or, the enabling or disabling of the receiving state of reset instructions is realized by pressing-down or non-pressing-down of a control key; when the control key is pressed down to be in a pressing-down state, the receiving state of reset instructions of the intelligent terminal is started, it is indicated that high level is valid and the sequence code input at this moment is valid; when the control key is pressed again to be in a non-pressing-down state, the receiving state of reset instructions of the intelligent terminal is disabled, it is indicated that low level is invalid and the sequence code input at this moment is invalid. The input mode of the reset instruction according to the disclosure can prevent a user from entering into a soft reset program by mistake when the input information and dialed number are coincidentally the same as the reset instruction. The reset instruction is an assemblage sequence of the keyboard keys of the intelligent terminal. The reset instruction may be either a key assemblage of letter keys, such as "adgj", "ajtwp" and the like, or the reset instruction may be a key assemblage of number keys, such as "12345", "101001" and the like; the length and the assemblage mode of the above reset instruction can be set arbitrarily.

The sequence detector 17 is connected with the mode selecting module 18, and is configured to complete detection of a keyboard sequence code input by a user, that is, detecting whether the sequence code input by a user is a reset instruction. The process of detecting the sequence code is as follows: when the soft reset instruction is set as 1010, the detector first detects the first instruction, and if the first instruction is 1, the detector continues to detect the second sequence, otherwise, the detector outputs a high resistance Z; when detecting that the second sequence is 0, the detector continues to detect the third sequence, otherwise, the detector outputs a high resistance Z; when detecting that the third sequence is 1, the detector continues to detect the is fourth sequence, otherwise, the detector outputs a high resistance Z; when detecting that the fourth sequence is 0, the detector outputs a low level 0 to the mode selecting module 18 and then selects the soft reset. Likewise, when the hard reset instruction is set as 0101, in the condition that the enabling of key is valid, when the sequence detector detects this sequence according to the rules above, the detector outputs a high level 1 to the mode selecting module 18 and then selects the hard reset.

The soft reset enabling module 110 and the hard reset enabling module 19 are connected with the mode selecting module 18, and are configured to output different reset valid signals RST0_N and RST1_N corresponding to different inputting modes. The reset enabling signal is of high level at the beginning, when it is detected that a user needs to perform a reset operation, a low level pulse is generated immediately and lasts for three clock periods, then the reset enabling signal is recovered to high level state.

The reset management module 111 is configured to manage the reset work mode of the intelligent terminal; when the intelligent terminal works normally, the reset management module detects that other modules are in a sleep state, even if there is a misoperation during inputting, it is unable to activate the soft reset output enabling module 110 to work; when the intelligent terminal is in a dead halt state or an abnormal instruction state, the soft reset output enabling module 110 is activated immediately to enter into the quick soft reset state. In this way, not only faulty reset can be prevented, but also energy consuming caused by soft reset of system can be saved to lengthen the standby time of the system.

The baseband chip 12 is connected with the reset module and is communicated with the reset module through a General Purpose Input Output (GPIO) interface; when the GPIO_RST pin of the baseband chip receives a reset low level, the baseband chip is reset, the baseband chip restores the kernel ARM and DSP chip to an initial program line, then the system reloads to operate.

The reset display module 15 is connected with the baseband chip 12; when the system is reset successfully, the baseband chip outputs a signal level to a turn-on indictor lamp of the intelligent terminal, and lighting of the indicator lamp indicates that reset is successfully.

The FLASH memory module 14 is connected with the baseband chip 12; when the system receives a hard reset instruction, an Application Programming Interface (API) program is called to clear problematic programs in the intelligent terminal and erase the third-party softwares and problematic programs in the FLASH chip, and then the intelligent terminal restores the security system.

The power management module 13 is connected with all other modules, and is configured to supply voltage required for the normal operation of the system. Meanwhile, when the intelligent terminal is in an powered-on reset state, the power management module receives a reset low level signal PS_HOLD from the baseband chip and outputs a reset enabling signal to the resetting module, to complete the powering-on and resetting process.

Figure 3:
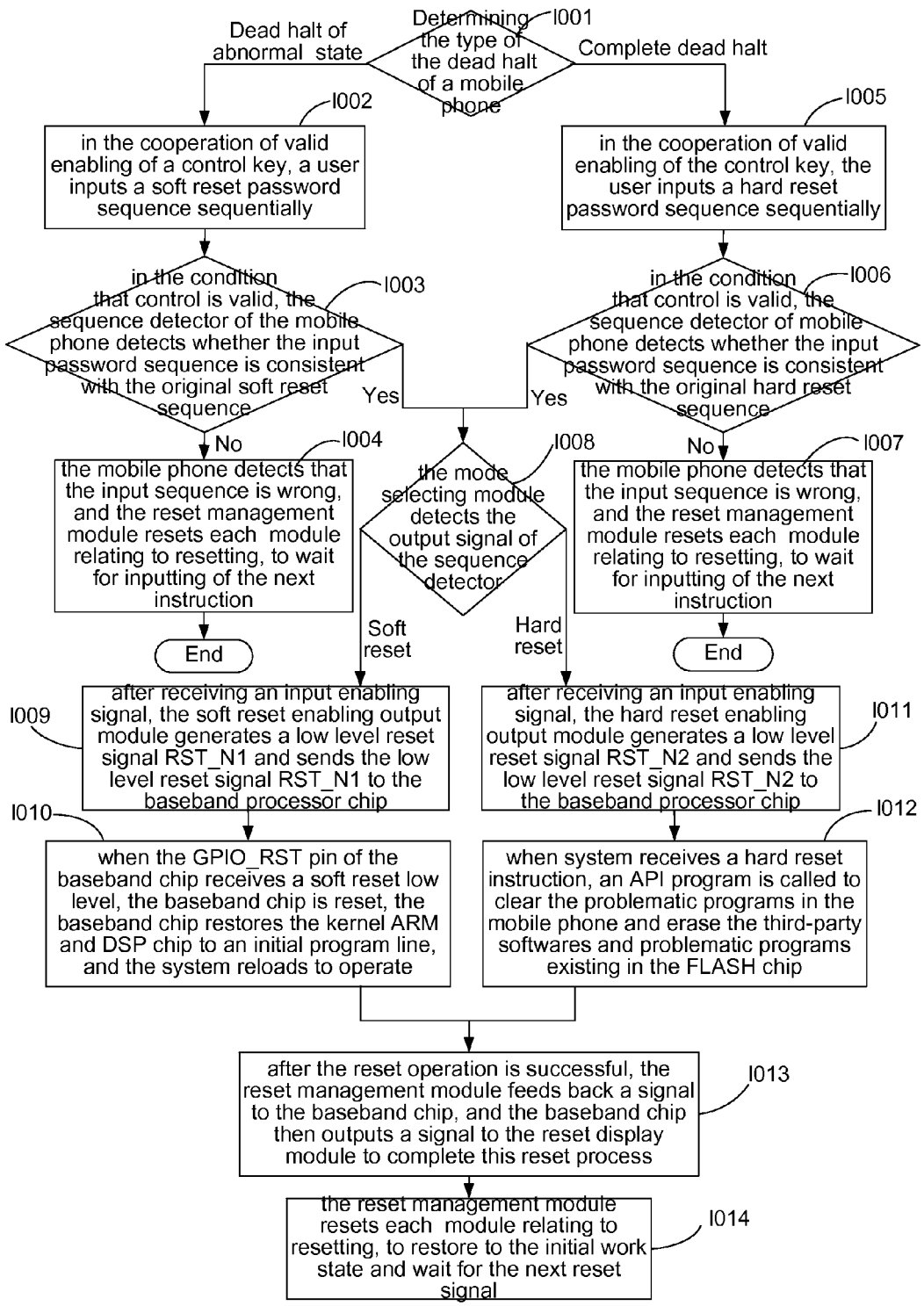
FIG. 3 shows a flowchart illustrating a resetting application of an intelligent terminal according to the disclosure.

FIG. 3 shows a flowchart of a resetting application of an intelligent terminal according to the disclosure, and the processing flow as shown in FIG. 3 is a flowchart after the intelligent terminal is currently in a dead halt state or an abnormal instruction state; as shown in FIG. 3, the resetting application flow of the intelligent terminal according to the disclosure comprises:

step 1001: the type of a dead halt is determined in accordance with the response to a user's key pressing, when the intelligent terminal is in an abnormal work state, step 1002 is executed; when the intelligent terminal is in a complete dead halt state with no response, step 1005 is executed; and step 1001 can be executed when the user starts the receiving state of reset instructions of the intelligent terminal, or the current running state of the intelligent terminal can be determined after the user inputs a reset instruction and the reset instruction is confirmed to be correct; those skilled in the art should understand that the above execution result corresponds to the execution mode;

step 1002: in the cooperation of valid enabling of the control key, the user inputs a soft reset password sequence sequentially; that is, when being in the reset instruction receiving state, the intelligent terminal receives the reset instruction input by the user;

step 1003: in the condition that control key is valid, a sequence detecting module is of the intelligent terminal detects whether the input password sequence is consistent with the originally stored soft reset sequence, if yes, step 1008 is executed; otherwise, step 1004 is executed;

step 1004: the intelligent terminal detects that the input sequence is wrong, the reset management module resets each module relating to resetting, to wait for the inputting of the next instruction; the flow is ended;

step 1005: in the cooperation of valid enabling of control key, the user inputs a hard reset password sequence sequentially, and then step 1006 is executed;

step 1006: in the condition that control key is valid, a sequence detector of the intelligent terminal detects whether the input password sequence is consistent with the original hard reset sequence, if yes, step 1008 is executed; otherwise, step 1007 is executed;

step 1007: the intelligent terminal detects that the input sequence is wrong, the reset management module resets each module relating to resetting, to wait for the inputting of the next instruction; the flow is ended;

step 1008: the mode selecting module detects the output signal of the sequence detector, if the output signal is a soft reset signal, step 1009 is executed; and, if the output signal is a hard reset signal, step 1011 is executed;

step 1009: after receiving an input enabling signal, the soft reset enabling output module generates a low level reset signal RST_N1 and sends the low level reset signal RST_N1 to the baseband processor chip, and then step 1010 is executed;

step 1010: when the GPIO_RST pin of the baseband chip receives a soft reset low level, the baseband chip is reset, the baseband chip restores the kernel ARM and DSP chip to an initial program line, and the system reloads to operate; and then step 1013 is executed;

step 1011: after receiving an input enabling signal, the hard reset enabling output module generates a low level reset signal RST_N2 and sends the low level reset signal RST_N2 to the baseband processor chip, and then step 1012 is executed;

step 1012: when the system receives a hard reset instruction, an API program is called to clear the problematic programs in the intelligent terminal and erase the third-party softwares and problematic programs in the FLASH chip, and the intelligent terminal restores the security system; and then step 1013 is executed;

step 1013: after the reset operation is successful, the reset management module feeds back a signal to the baseband chip, and then the baseband chip outputs a signal to the reset display module to complete this reset process; and then step 1014 is executed; and step 1014: the reset management module resets each module relating to resetting, to restore to the initial work state and wait for the next reset signal; the flow is ended.

The above are only the preferred embodiments of the disclosure and are not intended to limit the protection scope of the disclosure.

The invention claimed is:

1. A method for resetting an intelligent terminal, comprising:
   receiving an input reset instruction after a receiving state of reset instructions is started;
   determining a current running state of an intelligent terminal when determining that the received reset instruction is valid, and triggering a reset of the intelligent terminal when the intelligent terminal is in a dead halt state or an abnormal instruction state,
   wherein the resetting of the intelligent terminal comprises:
   receiving a soft/hard password sequence input sequentially by a user, in the cooperation of valid enabling of a control key;
   detecting, by a mode selecting module of the intelligent terminal, whether the output signal of a sequence detector is a soft reset signal, when the input soft/hard password sequence is consistent with the original soft/hard reset sequence;
      if yes, generating and sending, by a soft reset enabling output module, a low level reset signal RST_N1 to a baseband chip, after receiving an input enabling signal; and restoring, by the baseband chip, the kernel ARM and DSP chip to an initial program line, when the GIPO_RST pin of the baseband chip receives a soft reset low level;
      otherwise, if the output signal of a sequence detector is a hard reset signal, generating and sending, by a hard reset enabling output module, a low level reset signal RST_N2 to a baseband chip, after receiving an input enabling signal; and clearing the problematic programs and erasing the third-party softwares and problematic programs in the FLASH chip.

2. The method according to claim 1, wherein the step of triggering the reset of the intelligent terminal comprises:
   triggering a hard reset of the intelligent terminal when the intelligent terminal is in a dead halt state; and
   triggering a soft reset of the intelligent terminal when the intelligent terminal is in an abnormal instruction state.

3. The method according to claim 1, further comprising:
   setting a key of the intelligent terminal as a reset starting key; and
   starting, by the intelligent terminal, the receiving state of reset instructions when a duration of the reset starting key being pressed reaches a set threshold.

4. The method according to claim 1, further comprising:
   executing no reset instruction, when the reset instruction is valid and the current running state of the intelligent terminal is a normal instruction state.

5. A device for resetting an intelligent terminal, comprising: a starting unit, a receiving unit, a determining unit, a determination unit and a resetting unit; wherein
   the starting unit is configured to start a receiving state of reset instructions of the intelligent terminal;
   the receiving unit is configured to receive a reset instruction input by a user;
   the determining unit is configured to trigger the determination unit when determining that the reset instruction is valid;
   the determination unit is configured to determine a current running state of the intelligent terminal, and trigger the resetting unit when the intelligent terminal is in a dead halt state or an abnormal instruction state; and
   the resetting unit is configured to reset the intelligent terminal,
   wherein the receiving unit is further configured to receive a soft/hard password sequence input sequentially by a user, in the cooperation of valid enabling of a control key; the determining unit is further configured to determine whether the output signal of a sequence detector is a soft reset signal, when the input soft/hard password sequence is consistent with the original soft/hard reset sequence; and
   the reset unit is further configured to generate and send a low level reset signal RST N1 to a baseband chip, after receiving an input enabling signal, when the output signal of a sequence detector is a soft reset signal, and the baseband chip restores the kernel ARM and DSP chip to an initial program line, when the GPIO RST pin of the baseboard chip receives a soft reset low level;
   the reset unit is further configured to generate and send a low level reset signal RST N2 to the baseband chip, after receiving an input enabling signal, when the output signal of a sequence detector is a hard reset signal, and clear the problematic programs and erase the third-party softwares and problematic programs in the FLASH chip.

6. The device according to claim 5, wherein the resetting unit triggers a hard reset of the intelligent terminal when the determination unit determines that the intelligent terminal is in a dead halt state; and
   the resetting unit triggers a soft reset of the intelligent terminal when the determination unit determines that the intelligent terminal is in an abnormal instruction state.

7. The device according to claim 5, further comprising a setting unit configured to set a key of the intelligent terminal as a reset starting key;
   wherein when a duration of the reset starting key being pressed reaches a set threshold, the starting unit starts the receiving state of reset instructions of the intelligent terminal.

8. The device according to claim 5, wherein the resetting unit executes no reset instruction, when the determining unit determines that the reset instruction is valid and the determination unit determines that the current running state of the intelligent terminal is a normal instruction state.

* * * * *